United States Patent Office 3,352,516
Patented Nov. 14, 1967

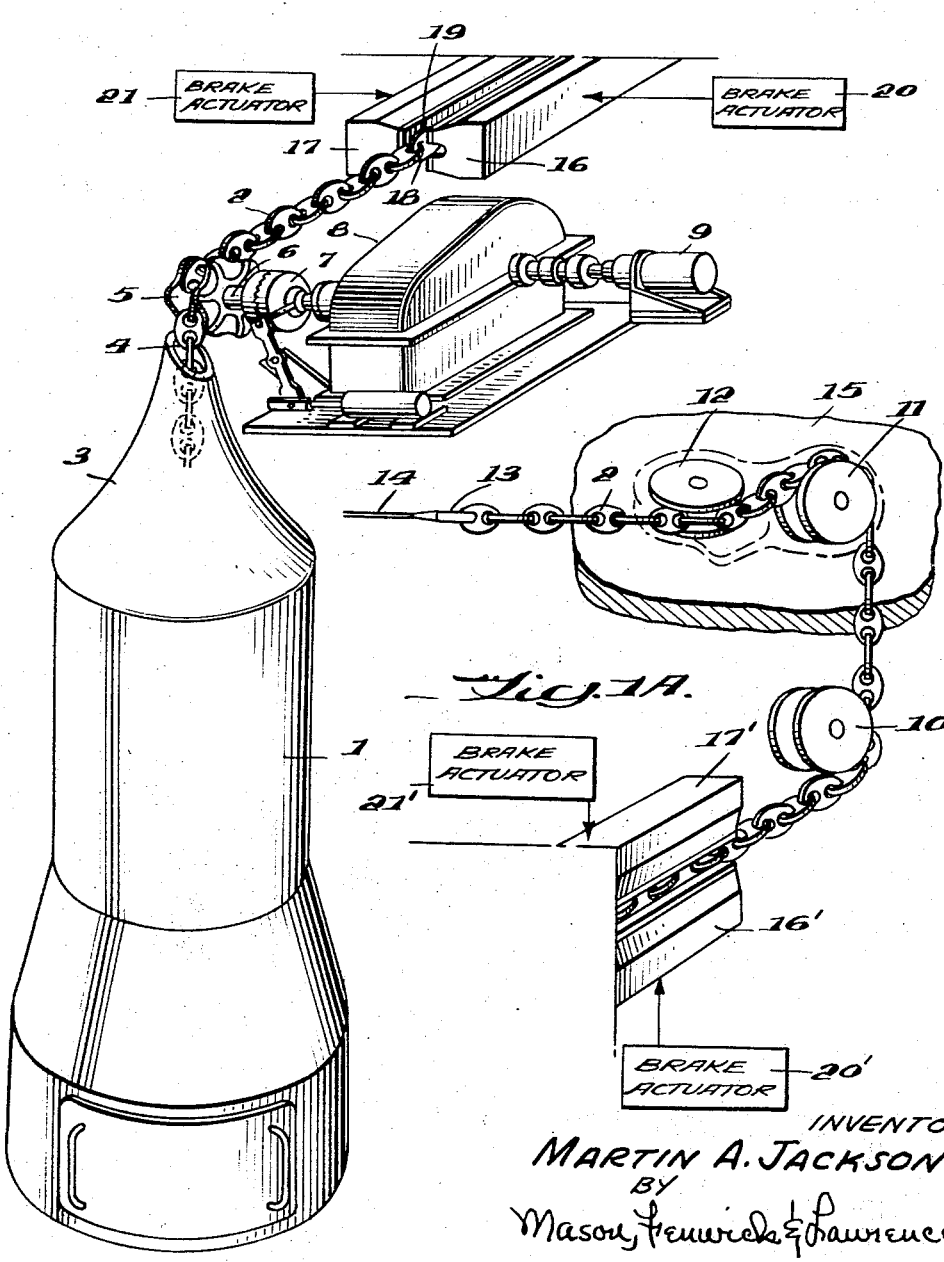
Nov. 14, 1967   M. A. JACKSON   3,352,516
WILDCAT ARRESTING GEAR
Filed March 11, 1966   5 Sheets-Sheet 1
INVENTOR
MARTIN A. JACKSON
BY
Mason, Fenwick & Lawrence
ATTORNEYS

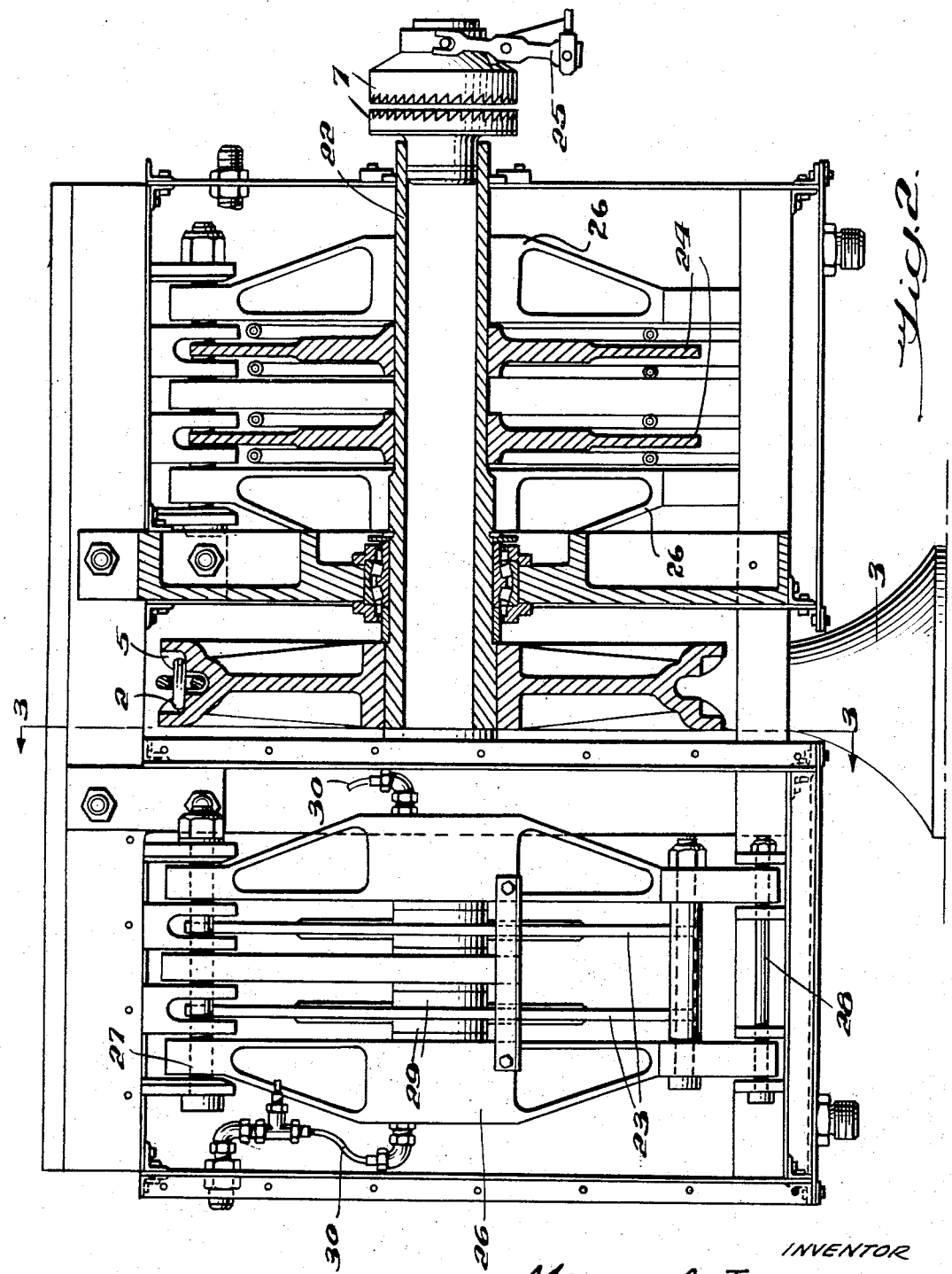

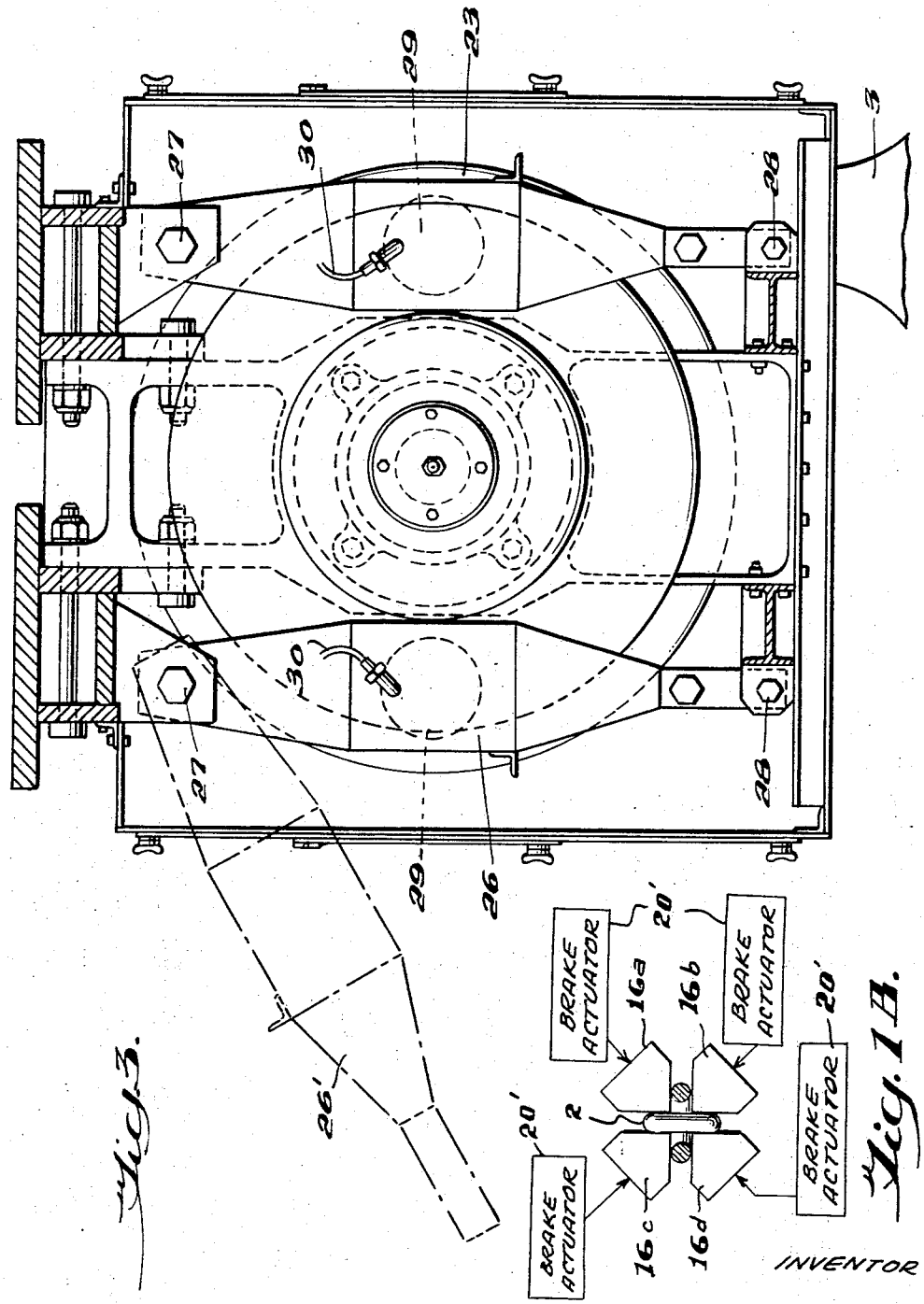

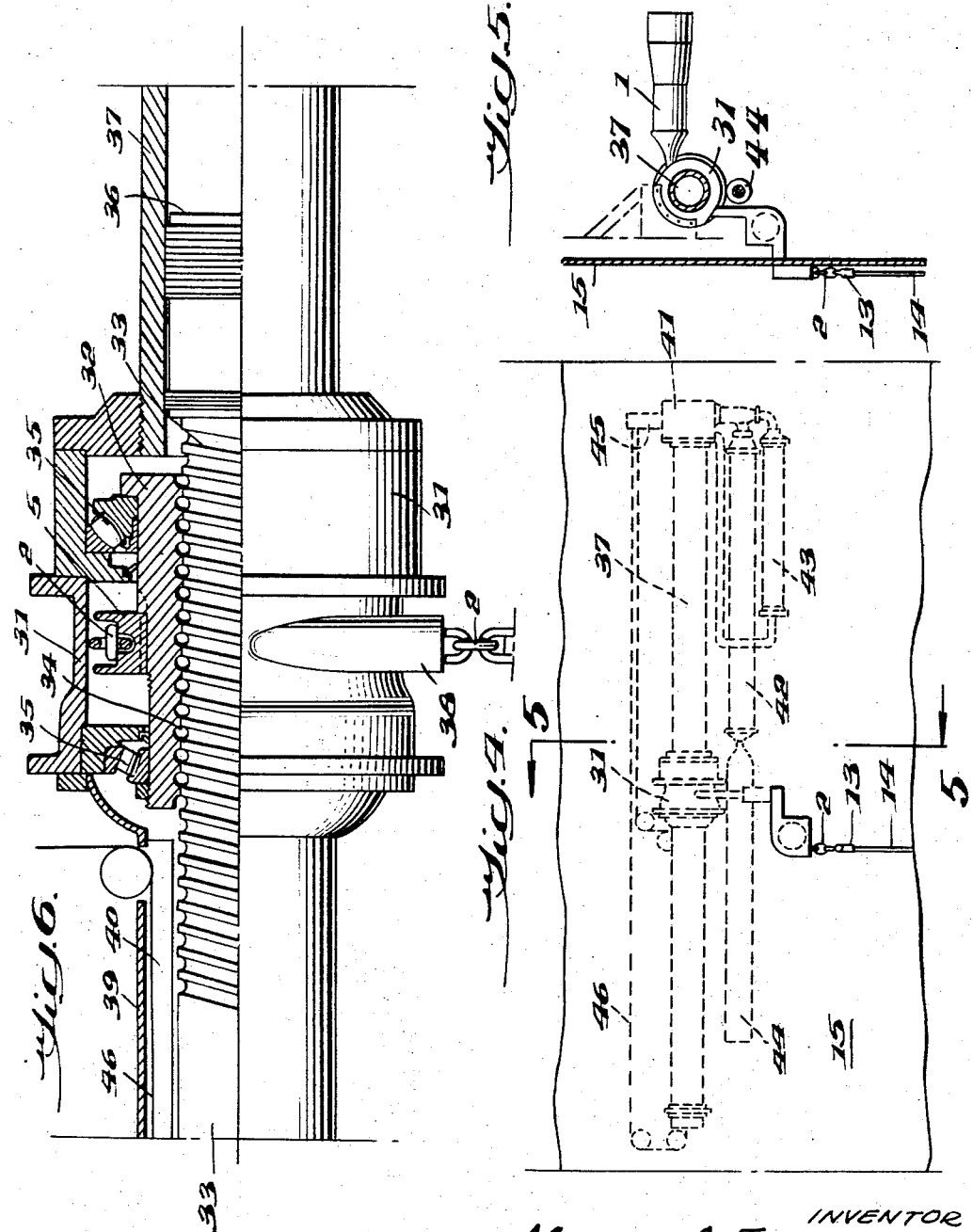

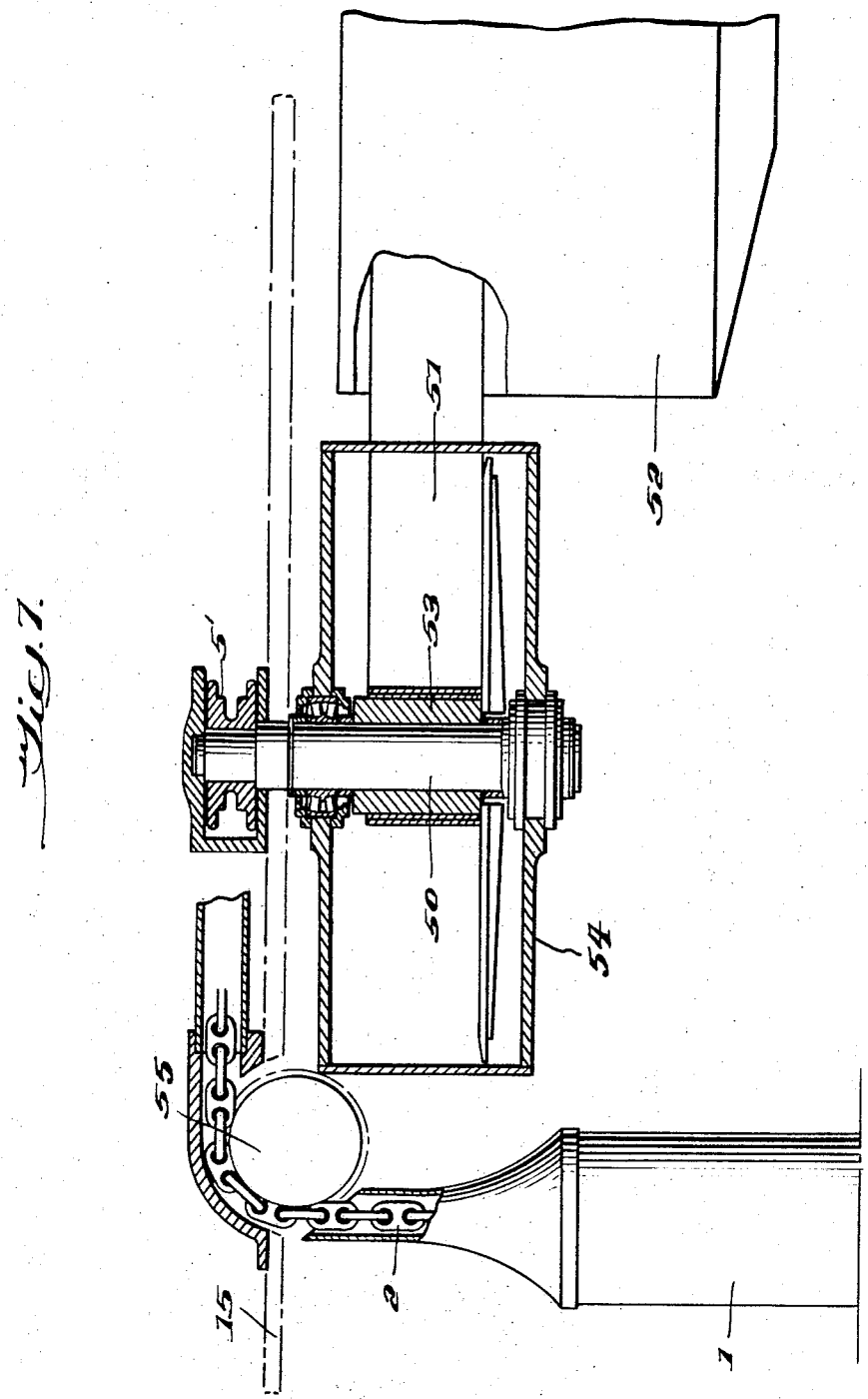

3,352,516
WILDCAT ARRESTING GEAR
Martin A. Jackson, Bradshaw, Md., assignor to Van Zelm Associates Inc., Baltimore, Md., a corporation of Maryland
Filed Mar. 11, 1966, Ser. No. 533,684
10 Claims. (Cl. 244—110)

ABSTRACT OF THE DISCLOSURE

An aircraft arresting gear system having a vertical chain stowage locker for storing a stud-link drag chain adjacent a landing surface and having brake means through which the chain is pulled by engagement of an aircraft with aircraft engaging cable means attached to one end of the chain.

---

The arresting gear consists of the pendant or cable which is stretched across and spaced from the surface where aircraft lands. The cable is engaged by the landing hook of the aircraft and the energy of the aircraft is absorbed by a mechanism that permits paying out of the pendant or cable while at the same time some retarding force is applied to absorb the energy of the aircraft transmitted through the cable.

The principal object of this invention is to provide a low inertia, rapid cycling arresting gear. The inertia of the arresting gear consists essentially of the mass of the pendant or cable, the energy absorber, and the purchase member or means interconnecting the pendant or cable and energy absorber whereby the energy is transmitted from the pendant to the energy absorber where it is dissipated.

Considerable work has been done in the field of energy absorbers to absorb high energy loads or loads having high initial impact or loads of such magnitude that the initial impact will break the gear where the inertia of the energy absorber is such that it takes an appreciable amount of time to be overcome before the energy is absorbed. Arresting gear units have been designed and used which involve the use of a metal tape in a metal bender wherein the energy is absorbed by the progressive bending beyond the elastic limit of successive increments of the metal tape. Such tapes are expendable, being used only once. To reuse such an arresting gear a new tape must be loaded in the gear for each arrestment. Such gear are not practical for use on shipboard landing surfaces, such as aircraft carriers, because of the slow rate of recycling while preparing the arresting gear in the shortest possible time for the next arrestment due to the fact that on an aircraft carrier a great number of aircraft must be landed in a short period of time.

It is an object of this invention therefore to provide a low inertia arresting gear that can be recycled or reset for the next arrestment in a very short period of time.

It is another object of this invention to provide a low inertia arresting gear wherein the energy absorbing unit is not moved all at once but rather small increments of the energy absorbing unit, particularly the portion known as the purchase member, can be accelerated in small increments rather than simultaneously.

Further and other objects will become apparent from the description of the accompanying drawings in which like numerals refer to like parts.

FIGURE 1 is a perspective view of a portion of an arresting gear;

FIGURE 1a is the remainder of the arresting gear shown in FIGURE 1;

FIGURE 1b is a somewhat diagrammatic section view of an alternate form of chain brake block arrangement usable with the gear of FIGURES 1, 1a.

FIGURE 2 is an elevational view partly in section showing the disc brake energy absorber;

FIGURE 3 is an end view of the disc brake energy absorber;

FIGURE 4 is a plan view of a linear hydraulic arresting gear installed underneath the deck of an aircraft carrier;

FIGURE 5 is a diagrammatic section view of the installation shown in FIGURE 4, taken along the line 5—5 of FIGURE 4;

FIGURE 6 is a detail of the arresting gear shown in FIGURES 4 and 5; and,

FIGURE 7 is an elevation partly in section showing another embodiment of an arresting gear employing a rotary hydraulic energy absorber.

In all of the arresting gears shown in the drawings, the conventional pendant or arresting cable, associated for example with an aircraft carrier deck, is shown secured by coupling to a chain, which may be any conventional type of chain but in this specific herein disclosed embodiment in a stud link chain used as a purchase member. The chain drives an energy absorber or has an energy absorber associated with it so that as the energy of a landing aircraft is transmitted to the cable and to the chain, the energy will be absorbed or dissipated and the aircraft brought to rest.

The stud link chain in this specific embodiment is a common type of chain in which the links are generally oval in the plan form and each link has welded between the sides thereof a stud or transverse member. Stud link chain has the advantage that it will not tangle or snarl when dropped vertically into a chain stowage locker. The chain of this design will also travel over a chain sprocket, commonly called a wildcat, from which the name of this arresting gear is derived.

Referring to the drawings illustrating a specific embodiment of the invention, and particularly to FIGURE 1, there is shown a chain locker or a stowage locker of conventional design, in which stud link chain 2 is stowed. The chain stowage locker 1 is located beneath the deck of an aircraft carrier or beneath the ground surface of a landing field. The upper portion of the chain stowage locker 1 consists of a cone 3, having a circular outlet 4 through which the chain passes into and out of the chain stowage locker. The chain's sprocket or wildcat is shown at 5 mounted on a shaft 6. A motor 9 through a gear box 8 and clutch 7 can rotate the chain's sprocket 5 to retrieve the stud link chain and drop it generally vertically into the stowage locker 1. As pointed out above, one of the features of this type of chain is that it will not snarl or tangle as it is dropped generally vertically into the chain stowage locker.

Chain 2 passes from sprocket 5 to a similar sprocket 10 and through the deck 15 to a sprocket 11 and/or a horizontal deck sheave or sprocket 12. Coupling 13 secures chain 2 to deck pendant core arrestment cable 14 stretched across the carrier deck. The spacing of sprockets 5 and 10 can be such that chain 2 will have sufficient length so that brake blocks 16 and 17 can be arranged longitudinally of the chain between these sprockets. Brake blocks 16 and 17 are grooved for the passage of the alternate links of the chain 2 and the remainder of the links of the chain 2 are engaged by brake surfaces 18 and 19 on brake blocks 16 and 17 to absorb the kinetic energy of the chain and dissipate it. Brake blocks 16 and 17 can be moved one relative to the other to engage chain 2 by brake actuators 20 and 21 which can be of any conventional design. Other sets of brake blocks 16' and 17' can be arranged along chain 2 positioned 90° from the set of brake blocks 16 and 17 to engage the links of the chain not engaged by blocks 16 and 17. Brake actuators 20' and 21' serve to actuate brake blocks 16' and 17' in a manner similar to those of brake blocks 16 and 17.

If the arresting hook of an aircraft landing on the carrier engages cable 14, it will begin to move with the aircraft along the deck. The kinetic energy of the motion of the aircraft will be transmitted to a purchase member or cable 2. Clutch 7 is disengaged so that sprocket 5 may move freely. As the impact of the aircraft in continued motion accelerates the chain 2, only a relatively short length of the chain between the coupling 13 and the chain in the chain locker 1 will be subjected to initial acceleration. Thereafter the chain is accelerated one link at a time as it is picked out of the mass of chain in the chain locker. Brakes 16, 17, 16' and 17' then afford an energy absorber on the chain member 2 to absorb and dissipate the kinetic energy transmitted to the chain in the arrestment of an aircraft.

Upon completion of the arrestment, clutch 7 is engaged and motor 9 started to quickly retrieve the chain and pass it through opening 4 into chain stowage locker 1 so that it will be ready for the next arrestment. It is to be understood that it is usual to have dual installations of the equipment shown in FIGURES 1 and 1a on each side of the landing strip of the aircraft carrier or other landing surfaces.

Instead of using the two sets of brake blocks 16, 17 and 16', 17' to apply braking force to the chain links, a brake block arrangement of the type shown in FIGURE 1b may be used, wherein elongated brake blocks 16a, 16b, 16c and 16d of substantially quadrant cross-sectional configuration surround the chain and define a cross-shaped passage therefor wherein pairs of confronting surfaces of the individual blocks adjoining the apices thereof may engage the portions of the chain links passing therebetween to apply braking force thereto. Any suitable actuator means, either of known mechanical or hydraulic types, indicated at 20', may be employed to drive the brake blocks toward and away from the chain links.

FIGURE 2 shows an elevation partly in section of an energy absorber of the disc brake type for absorbing kinetic energy of the chain, which may be used instead of the brake blocks of FIGURE 1. The top of chain stowage locker 1 is shown feeding chain 2 over chain sprocket 5. Mounted on the shaft 22 with chain sprocket 5 are discs 23 and 24. Also mounted at the end of shaft 22 is clutch 7 which is normally disengaged during an arrestment but can be engaged by moving lever 25 to engage the motor drive for retrieving chain 2 and returning it to the stowage locker 3.

Discs 23 and 24 have mounted on each side thereof frames 26 secured in place by bolts 27 and 28. Frames 26 carry what are known as button brakes 29 mounted on the frame on each side of each disc. Hydraulic fluid through lines 30 actuates the button brakes 29 to apply opposed forces on the periphery of the discs 23, 24 and thereby exert a braking effort. Chain sprocket 5 is moved by the kinetic energy in chain 2. By applying hydraulic pressure to the button brakes 29, the kinetic energy of the chain can be absorbed in the plurality of brakes shown in FIGURES 2 and 3. Frame member 26 is shown in FIGURE 3 pivoted outwardly about bolt 27 to position 26' to demonstrate that the button brakes 29 may be serviced or repaired or replaced by moving the frame on which they are mounted to the position shown.

The energy absorber device as shown in FIGURES 2 and 3 can be applied to chain 2 to absorb the kinetic energy of the chain in the same manner as the braking device 16, 17, 16', 17' described in connection with FIGURE 1.

FIGURES 4, 5 and 6 illustrate an hydraulic type of shipboard arresting gear employing the concept described above wherein chain 2 moves the chain sprocket 5 which is secured to the nut 32. The screw is shown at 33 and balls 34 are positioned between nut 32 and screw 33 to afford the drive of the screw upon rotation of the nut. Nut 32 is held in position within housing 31 by bearings 35. A piston 36 is moved by the screw 33 within cylinder 37. A tube 38 is mounted tangentially of housing 31 for the passage of chain 2. The end of screw 33 opposite piston 36 is shown in housing 39 which is merely a protective cover for the screw and a support for guide 40 which engages a projection (not shown) on the outer end of the screw to prevent the rotation of the screw.

Piston 36 forces fluid from cylinder 37 through a pressure control valve 41 to an accumulator 42. A fluid cooler is provided at 43 and an air flask at 44 is connected to the accumulator 42 for the return stroke of the piston 36 and the retrieval of the chain. A constant runout control is shown at 45 which is controlled by a line 46 secured to screw 33 and is moved thereby.

FIGURE 5 shows the portions of the arresting gear that are under deck 15. FIGURE 5 also demonstrates that the portions shown in dashed lines in FIGURE 4 are those portions beneath the deck and the portions in full lines are shown as those portions above the deck.

FIGURE 7 shows another arrangement of the equipment to absorb the energy of the arresting gear. The chain locker is shown at 1 and the chain at 2 passing over chain pulley 55. Along the length of the chain is positioned a sprocket or wildcat 5' which is moved by the motion of the chain 2. The rotary motion of chain sprocket 5' will be imparted to shaft 50 which will wind tape 51 on mandrel 53 mounted on shaft 50. The tape is unwound from a spool located in chamber 52. The unwinding of tape 51 from the spool in chamber 52 will be resisted by any one of a number of well known devices in which the rotary motion of a member is resisted by a fluid and the energy is absorbed by the rotary motion of the fluid. A rotary hydraulic gear is very velocity sensitive and has a rapid drop off in load as the rotational velocity decreases. The arrangement of FIGURE 7 compensates for this by using a changing drive ratio. This is accomplished by using a tape 51 which unwinds from one drum in the chamber 52 and winds upon another, namely the mandrel 53 in housing 54. The constantly changing drum diameters change the drive ratio to keep the energy absorber at a fairly constant velocity through the runout.

The foregoing describes a shipboard arresting gear employing chains and chain sprockets and devices in combination therewith arranged to reduce the inertia of the moving parts on the arrestment of an airplane and rapidly recycle the moving parts to put them in the starting position for the next arrestment of the airplane.

It is to be understood that certain changes, alterations, modifications and substitutions can be made in the arresting gear within the spirit and scope of the appended claims.

What is claimed is:

1. A low inertia, repeatable use arresting gear for arresting aircraft during landings, comprising an arresting cable to be supported adjacent a landing surface, a chain secured to one end of said cable, a vertically arranged chain locker located adjacent said landing surface for the stowage of said chain, said chain locker having an opening in the top thereof for the vertical ingress and egress of said chain, chain sprocket means for aligning said chain with said opening in said stowage locker and guiding and positioning said chain adjacent said arresting cable, means to absorb the kinetic energy of said chain to retard said chain during an arrestment, and power means to engage said chain to return said chain to said chain stowage locker after an arrestment.

2. The arresting gear as set forth in claim 1, including a chain sprocket of said chain sprocket means having clutch and motor means mounted coaxially therewith to drive said chain sprocket and said chain when said clutch is engaged to return said chain to said stowage locker after an arrestment.

3. The arresting gear as set forth in claim 1, including a chain sprocket of said chain sprocket means having a brake and clutch means mounted coaxially therewith, said brake means being driven by said chain sprocket, said brake means being of the disc brake type that affords effective braking effort with a minimum of inertia retarding force.

4. The arresting gear as set forth in claim 1, in which said means to absorb the kinetic energy of said chain comprises opposed, brake blocks positioned along said chain, and means to effect relative motion of said brake blocks to selectively exert a braking effort on said chain to absorb kinetic energy and disengage said chain from said blocks.

5. The arresting gear as set forth in claim 1, including a chain sprocket of said chain sprocket means, a drive screw assembly including an axially movable screw, an internally threaded rotary nut surrounding said screw and threadedly coupled therewith for driving said screw axially, means for rotating said nut responsive to rotation of said chain sprocket, a piston and cylinder assembly positioned to be driven by said screw to cause fluid to flow from said cylinder, means to meter the flow of fluid to absorb the kinetic energy of said chain, and pressure means to return said piston and cylinder to the starting position and thereby said chain to said stowage locker.

6. The arresting gear as set forth in claim 1, including a chain sprocket of said chain sprocket means, mounted on a shaft, a tape mounted on a spool driven by said shaft to wind said tape as it unwinds from a coil of tape, rotary hydraulic energy absorbing means driven by the unwinding of said coil of tape to absorb the kinetic energy of said chain.

7. The arresting gear system of claim 1 wherein said chain is a stud link chain.

8. The arresting gear as set forth in claim 7, including a chain sprocket of said chain sprocket means having clutch and motor means mounted coaxially therewith to drive said chain sprocket and said chain when said clutch is engaged to return said chain to said stowage locker after an arrestment.

9. The arresting gear as set forth in claim 7, in which said means to absorb the kinetic energy of said chain comprises opposed, brake blocks positioned along said chain, and means to effect relative motion of said brake blocks to selectively exert a braking effort on said chain to absorb kinetic energy and disengage said chain from said blocks.

10. The device of claim 9 wherein said brake blocks comprise first and second pairs of brake blocks with the blocks of each particular pair being movable toward each other to grasp said chain but with each respective pair of blocks being mounted for movement in respectively perpendicular planes.

References Cited

UNITED STATES PATENTS

| Re. 364 | 3/1856 | Brown | 114—200 |
| 248,331 | 10/1881 | Lucas | 114—200 |

FOREIGN PATENTS

| 1,355,687 | 2/1964 | France. |
| 907,078 | 10/1962 | Great Britain. |
| 960,215 | 6/1964 | Great Britain. |

FERGUS S. MIDDLETON, *Primary Examiner.*

MILTON BUCHLER, *Examiner.*

P. E. SAUBERER, *Assistant Examiner.*